(12) United States Patent
Ikegami

(10) Patent No.: US 8,794,227 B2
(45) Date of Patent: Aug. 5, 2014

(54) TOP PLATE FOR COOKING APPLIANCE

(75) Inventor: Koji Ikegami, Otsu (JP)

(73) Assignee: Nippon Electric Glass Co., Ltd., Shiga (JP)

( * ) Notice: Subject to any disclaimer, the term of this patent is extended or adjusted under 35 U.S.C. 154(b) by 636 days.

(21) Appl. No.: 12/747,025

(22) PCT Filed: Oct. 22, 2008

(86) PCT No.: PCT/JP2008/069111
§ 371 (c)(1),
(2), (4) Date: Jun. 9, 2010

(87) PCT Pub. No.: WO2009/075141
PCT Pub. Date: Jun. 18, 2009

(65) Prior Publication Data
US 2010/0269813 A1    Oct. 28, 2010

(30) Foreign Application Priority Data
Dec. 10, 2007   (JP) ................. 2007-318367

(51) Int. Cl.
*F24C 15/00*   (2006.01)

(52) U.S. Cl.
USPC ...... 126/220; 126/211; 126/227; 219/452.11; 219/620; 427/255.16

(58) Field of Classification Search
CPC .......... F24C 7/082; F24C 7/083; F24C 15/10; F24C 15/108; H05B 3/74; H05B 3/746; C23C 16/24; C23C 16/345
USPC ............. 126/220, 211, 227, 230; 219/452.11, 219/620, 448.11; 427/255.18, 255.21
See application file for complete search history.

(56) References Cited

U.S. PATENT DOCUMENTS 4,002,883 A * 1/1977 Hurko ............................ 219/543
7,009,150 B2 * 3/2006 Wennemann et al. ... 219/452.11
(Continued)

FOREIGN PATENT DOCUMENTS

EP   1 518 838 A1   3/2005
JP   8-75171 A      3/1996
(Continued)

OTHER PUBLICATIONS

Official Communication issued in corresponding Chinese Patent Application No. 200880112795.8, mailed on Jan. 18, 2011.

(Continued)

*Primary Examiner* — Avinash Savani
(74) *Attorney, Agent, or Firm* — Keating and Bennett, LLP

(57) ABSTRACT

To provide a top plate for a cooking appliance which can be provided with a touch sensor part without involving the provision of an insulating film and has excellent visibility of light for indication from a blue LED or the like disposed behind the top plate, excellent light shielding property for preserving the aesthetic quality, and excellent heat resistance. A top plate 10 for a cooking appliance disposed over the cooking appliance includes: a glass substrate 1; a light shielding layer 2 disposed on one side of the glass substrate 1, having a thickness of 50 to 190 nm and made of Si or Ge; and a protective layer 3 disposed on the light shielding layer 2 and made of at least one material selected from the group consisting of silicon nitride, silicon oxide, titanium oxide, niobium oxide, zirconium oxide, and tantalum oxide.

7 Claims, 1 Drawing Sheet

(56) References Cited

U.S. PATENT DOCUMENTS

| | | |
|---|---|---|
| 2003/0215642 A1* | 11/2003 | Carre et al. .................... 428/408 |
| 2005/0001541 A1* | 1/2005 | Yamazaki et al. ............. 313/503 |
| 2006/0132462 A1* | 6/2006 | Geaghan ........................ 345/173 |
| 2007/0295711 A1* | 12/2007 | Striegler et al. ........... 219/448.11 |
| 2008/0035896 A1* | 2/2008 | Striegler et al. ............. 252/520.3 |
| 2008/0264931 A1 | 10/2008 | Vilato et al. |
| 2009/0233082 A1 | 9/2009 | Esemann et al. |

FOREIGN PATENT DOCUMENTS

| | | |
|---|---|---|
| JP | 2003-208972 A | 7/2003 |
| JP | 2004-333102 A | 11/2004 |
| JP | 2005-063949 A | 3/2005 |
| JP | 2005-90906 A | 4/2005 |
| JP | 2006-004630 A | 1/2006 |
| JP | 2006-125645 A | 5/2006 |
| JP | 2006-330288 A | 12/2006 |
| JP | 2007-080701 A | 3/2007 |
| JP | 2007-170754 A | 7/2007 |
| JP | 2009-518797 A | 5/2009 |
| WO | 2006/111359 A1 | 10/2006 |
| WO | 2007/055217 A1 | 5/2007 |
| WO | 2007/066030 A1 | 6/2007 |

OTHER PUBLICATIONS

Official Communication issued in International Patent Application No. PCT/JP2008/069111, mailed on Jan. 20, 2009.

Official Communication issued in corresponding European Patent Application No. 08858917.1, mailed on Oct. 16, 2013.

* cited by examiner

TOP PLATE FOR COOKING APPLIANCE

TECHNICAL FIELD

This invention relates to top plates for cooking appliances disposed over cooking appliances, such as electromagnetic (IH) cooking appliances, infrared cooking appliances, and gas cooking appliances.

BACKGROUND ART

As top plates used for electromagnetic cooking appliances and infrared cooking appliances, low thermal expansion glass, ceramics or like material is used. Low thermal expansion glass, ceramics or like material has also come into use for top plates for gas cooking appliances because of its excellent aesthetic quality and cleanability. In these top plates using such glass or like material, a metal film, such as a Ti film, is formed on a substrate in order to visually hide internal components, such as a cooking appliance and a temperature sensor. The metal film gives a beauty of metallic luster or the like to the top plate.

FIG. 2 is a cross-sectional view showing such a conventional top plate for a cooking appliance. As shown in FIG. 2, a top plate 10 for a cooking appliance is provided with a light shielding layer 2 made of a metal film on a glass substrate 1, and a protective layer 3 made of a SiN film or the like on the light shielding layer 2. The light shielding layer 2 is provided, as described above, in order to give metallic luster to visually hide the internal cooking appliance. The protective layer 3 is provided in order to prevent the light shielding layer from being oxidized by heat application.

In the conventional top plate, a Ti film, for example, is formed as a light shielding layer 2 as described above. The use of a Ti film as a light shielding layer 2 provides good heat resistance. Meanwhile, the Ti film is a metal film having a high electrical conductivity. If a touch sensor part 4 is formed as shown in FIG. 2, an insulating film 7 must be provided in a region of the Ti film corresponding to the touch sensor part 4. A conductive ink layer 5 is formed in the touch sensor part 4 on the top surface of the substrate 1. By forming the insulating film 7, an electrostatic capacitance can be created between the conductive ink layer 5 and an electrode 6 disposed on the opposite side of the insulating film 7 to the conductive ink layer 5, thereby forming a capacitance switch.

Thus, in such a conventional top plate using as a light shielding layer 2 a good-conductivity metal film, such as a Ti film, an insulating film must be formed in a region of the top plate in which a touch sensor part is formed, in place of the light shielding layer and the protective layer. Therefore, there exists the need to form an insulating film, for example, by printing, mask the part in which the insulating film has been formed, and then form a light shielding layer and a protective layer. This poses the problem of complicated production process. Furthermore, the part in which the insulating film has been formed is different in color from the other part. Therefore, the problem of impaired aesthetic quality also arises. Hence, there is a demand for a top plate for a cooking appliance which can be provided with a touch sensor part without involving the provision of an insulating film.

Among recent known cooking appliances are those in which a light source, such as an LED, is internally disposed to use light from the light source as an indication that indicates the intensity of heating power or the like. However, conventional top plates for cooking appliances have low transmittance of light at short wavelengths and therefore have the problem of difficulty in transmitting such LED light, particularly blue LED light.

Patent Document 1 proposes a top plate for a cooking appliance in which a metal film made of one of various metals including Si and Ti is used as a light shielding layer. However, this conventional technique is intended to provide a top plate for a cooking appliance which can be given various colors and has excellent heat resistance, and is not contemplated to enhance the visibility of light for indication from a blue LED or the like. In addition, according to this conventional technique, the top plate could be given high marks for heat resistance but cannot satisfy a stricter standard of heat resistance.
Patent Document 1: Published Japanese Patent Application No. 2004-333102

DISCLOSURE OF THE INVENTION

An object of the present invention is to provide a top plate for a cooking appliance which can be provided with a touch sensor part without involving the provision of an insulating film and has excellent visibility of light for indication from a blue LED or the like disposed behind the top plate, excellent light shielding property for preserving the aesthetic quality, and excellent heat resistance.

The present invention provides a top plate for a cooking appliance disposed over the cooking appliance, the top plate including: a glass substrate; a light shielding layer disposed on one side of the glass substrate, having a thickness of 50 to 190 nm and made of Si or Ge; and a protective layer disposed on the light shielding layer and made of at least one material selected from the group consisting of silicon nitride, silicon oxide, titanium oxide, niobium oxide, zirconium oxide, and tantalum oxide.

In the present invention, the top plate is provided with a light shielding layer made of Si or Ge. A Si film and a Ge film are insulating metalloid films having lower electrical conductivities than a Ti film. Therefore, these films eliminate the need to provide an insulating film that would be needed in the conventional top plate for a cooking appliance in which a Ti film is disposed as a light shielding layer. Therefore, the top plate can be provided with a touch sensor part without involving the provision of an insulating film.

The light shielding layer in the present invention has a thickness of 50 to 190 nm. If the thickness of the light shielding layer is too large, its transmittance of light at short wavelengths is lowered, thereby reducing the visibility of light from an LED or the like for indicating the intensity of heating power or the like. On the other hand, if the thickness of the light shielding layer is too small, the metallic luster cannot be obtained and the light shielding ability to hide the internal structure of the cooking appliance is reduced, whereby the aesthetic quality is impaired. The thickness of the light shielding layer is more preferably 60 to 170 nm and particularly preferably 70 to 120 nm.

In the present invention, the light shielding layer is preferably disposed directly on the glass substrate.

In the present invention, a protective layer is disposed on the light shielding layer. The protective layer in the present invention is formed from at least one material selected from the group consisting of silicon nitride, silicon oxide, titanium oxide, niobium oxide, zirconium oxide, and tantalum oxide. The provision of such a protective layer can prevent the light shielding layer from being oxidized by heat application.

The protective layer in the present invention has a thickness of 50 to 200 nm. If the thickness of the protective layer is too large, the effect of preventing oxidation of the light shielding layer does not change but the cost rises. On the other hand, if the thickness of the protective layer is too small, the effect of preventing oxidation of the light shielding layer is less likely to be achieved. The thickness of the protective layer is more preferably 50 to 190 nm and particularly preferably 60 to 180 nm.

Furthermore, depending on the thickness of the protective layer, the wavelength range of light that can pass through the top plate changes. As described previously, the top plate generally has difficulty transmitting light at short wavelengths. Therefore, in order to allow the protective layer to efficiently transmit light from a blue light source, such as a blue LED, the thickness of the protective layer is preferably selected so that the minimum peak in the reflectance spectrum observed from the side of the top plate on which the protective layer is disposed is in the wavelength range of 470 to 480 nm. From this point of view, if the protective layer is formed from silicon nitride, the thickness is preferably 150 to 170 nm. If the protective layer is formed from silicon oxide, the thickness is preferably 67 to 87 nm. If the protective layer is formed from titanium oxide, the thickness is preferably 135 to 155 nm. If the protective layer is formed from niobium oxide, the thickness is preferably 145 to 165 nm. If the protective layer is formed from zirconium oxide, the thickness is preferably 155 to 175 nm. If the protective layer is formed from tantalum oxide, the thickness is preferably 150 to 170 nm.

In the present invention, by disposing the above-described light shielding layer and protective layer on the glass substrate, a touch sensor part can be provided without involving the provision of an insulating film, as described above. Furthermore, the top plate has excellent visibility of light for indication from a blue LED or the like disposed therebehind, excellent light shielding property for preserving the aesthetic quality, and excellent heat resistance.

In the present invention, the light shielding layer and the protective layer are preferably formed on the side of the top plate close to the interior in which the cooking appliance is located. In other words, the top plate for a cooking appliance of the present invention is preferably used to be disposed over the cooking appliance so that the side of the top plate on which the light shielding layer and protective layer are formed faces downward. However, the present invention is not limited to this position. The top plate may be disposed over the cooking appliance with the light shielding layer and protective layer positioned upward.

The method for forming the light shielding layer and protective layer in the present invention is not particularly limited. Although various conventional known methods for forming a thin film can be employed, these layers are preferably formed by vapor deposition technique, particularly by sputtering.

Materials that can be used as a glass substrate in the present invention include glasses resistant to rapid cooling from 600° C., i.e., glasses excellent in so-called thermal shock resistance. Specifically, the preferred glasses are those having a thermal expansion coefficient of $50 \times 10^{-7}/°$ C. or less. For example, low-expansion borosilicate glasses, low-expansion silica glasses and low-expansion crystallized glasses containing β-quartz solid solution as a primary crystal can be used. Particularly preferred are glasses having an average thermal expansion coefficient of $-10$ to $+30 \times 10^{-7}/°$ C. in the temperature range of 30° C. to 500° C., and more preferred are glasses having an average thermal expansion coefficient of $-10$ to $+20 \times 10^{-7}/°$ C. in the above temperature range, because all of them have still higher thermal shock resistance and are less likely to cause stress and be broken even if the temperature distribution in the glass substrate becomes wide during heat application.

Although the top plate for a cooking appliance of the present invention can be provided with a touch sensor part without involving the provision of an insulating film as described above, the present invention is not necessarily limited to such a top plate provided with a touch sensor part.

Furthermore, the top plate for a cooking appliance of the present invention can be used for a cooking appliance including a blue LED that can emit light for indication passing through the top plate for the cooking appliance. In this case, the top plate can transmit blue light from the blue LED with a high transmittance and therefore can display the light with good visibility. However, the present invention is also applicable to cooking appliances other than cooking appliances with a light source, such as a blue LED.

Effects of the Invention

The top plate for a cooking appliance of the present invention can be provided with a touch sensor part without involving the provision of an insulating film. Furthermore, the top plate for a cooking appliance of the present invention has excellent visibility of light for indication from a blue LED or the like disposed therebehind, excellent light shielding property for preserving the aesthetic quality, and excellent heat resistance.

Figure 1:
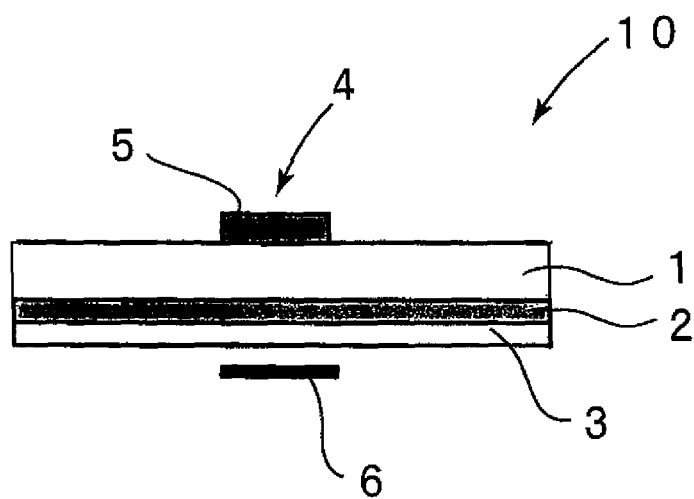
FIG. 1 is a cross-sectional view showing a top plate for a cooking appliance of an embodiment according to the present invention.
Figure 2:
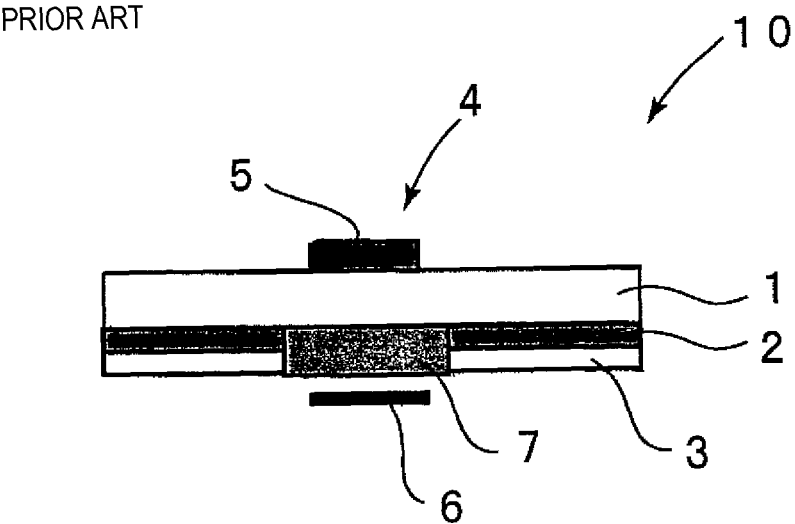
FIG. 2 is a cross-sectional view showing a conventional top plate for a cooking appliance.

| List of Reference Numerals | |
| --- | --- |
| 1 | glass substrate |
| 2 | light shielding layer |
| 3 | protective layer |
| 4 | touch sensor part |
| 5 | conductive ink layer |
| 6 | electrode |
| 7 | insulating film |
| 10 | top plate for cooking appliance |

BEST MODE FOR CARRYING OUT THE INVENTION

Hereinafter, the present invention will be described with reference to a specific embodiment but is not limited to the following embodiment.

FIG. 1 is a cross-sectional view showing a top plate for a cooking appliance of an embodiment according to the present invention. As shown in FIG. 1, a light shielding layer 2 is disposed on one side of a glass substrate 1, and a protective layer 3 is disposed on the light shielding layer 2. In this embodiment, the light shielding layer 2 is formed, for example, of a Si film and has a thickness ranging from 50 to 190 nm. The protective layer 3 is formed, for example, from $Si_3N_4$ and has a thickness ranging from 50 to 200 nm.

As shown in FIG. 1, a conductive ink layer 5 is formed on the other side of the glass substrate 1 in a region of the top plate in which a touch sensor part 4 is provided. An electrode 6 is disposed on the opposite side of the top plate to the conductive ink layer 5. As shown in FIG. 1, in this embodiment, the light shielding layer 2 and the protective layer 3 are formed also in a region of the top plate corresponding to the touch sensor part 4, like the other region. Since in the present invention the light shielding layer 2 is made of Si or Ge, it has lower electrical conductivity and higher insulation property than a Ti film. Therefore, there is no need to provide an insulating film in the touch sensor part, unlike the conventional techniques. This eliminates the need for the light shielding layer and the protective layer to be formed after the formation of an insulating film and masking. Hence, the production process can be simplified.

Furthermore, the touch sensor part can be formed in the same manner as the other parts. This eliminates the problem of difference in color between the touch sensor part and the other parts and enables the touch sensor part to be provided without impairing the aesthetic quality.

Examples

Hereinafter, the present invention will be described with reference to specific examples but is not limited to the following examples.

[Production of Top Plate for Cooking Appliance]

Crystallized glass ("Neoceram N-0" having an average linear thermal expansion coefficient of $-5 \times 10^{-7}/°$ C. in the temperature range of 30° C. to 500° C. and a thickness of 4 mm, manufactured by Nippon Electric Glass, Co., Ltd.) was used as glass substrates. Materials shown in TABLES 1 to 4 were used to form respective light shielding layers and protective layers with thicknesses shown in TABLES 1 to 4 on the glass substrates by sputtering.

The top plates thus obtained were evaluated for light shielding property, heat resistance and transmissivity to blue light in the following manners.

[Evaluation for Light Shielding Property]

For the obtained top plates the transmittances of light at various wavelengths from 400 to 700 nm were measured with a spectro-photometer by allowing the light to enter the top plates through their glass substrates. From the measured transmittances luminous transmittances were calculated according to JIS (Japanese Industrial Standard) Z 8071. Light shielding property for each top plate was evaluated from the average value of its luminous transmittances. Note that the lower the average luminous transmittance of light in the wavelength range from 400 to 700 nm, the more excellent the light shielding property.

[Evaluation for Heat Resistance]

Before and after subjected to a heat resistance test, color tone and chromaticity for the top plates were measured. Based on changes in color tone and chromaticity before and after the heat resistance test, heat resistances for the top plates were evaluated. Note that the larger the change in chromaticity, the more the color tone changed and the lower the heat resistance. The heat resistance test was implemented by heating each top plate at 400° C. for 30 minutes in an electric furnace.

The color tone was evaluated by visually observing the color of each top plate sample from the glass substrate side (the side on which no film was formed).

The chromaticity was obtained by allowing light at wavelengths from 400 to 700 nm to enter each top plate through the glass substrate, measuring the reflectance of the light with a spectro-photometer and calculating the chromaticity from the reflectance according to JIS (Japanese Industrial Standard) Z 8071.

[Transmissivity to Blue Light]

For the obtained top plates the transmittances of light at a wavelength of 475 nm were measured with a spectro-photometer, and their transmittances were evaluated in values relative to a reference value of 1 of Sample No. 12. Note that the transmittance was measured by allowing light at a wavelength of 475 nm to enter each top plate sample through its side on which the films were formed.

Furthermore, after the light shielding layer was formed on the glass substrate, the resistivity of the light shielding layer was measured with a tester. Note that if the resistivity is $10^6$ Ω/sq or more, the top plate can be determined to have insulation property.

The evaluation results on heat resistance, transmissivities to blue light, and the measurement results on resistivity are shown in TABLES 1 to 4.

TABLE 1

|  |  | No. 1 | | No. 2 | | No. 3 | | No. 4 | |
| --- | --- | --- | --- | --- | --- | --- | --- | --- | --- |
| Glass Substrate | | Crystallized Glass | | Crystallized Glass | | Crystallized Glass | | Crystallized Glass | |
| Light Shielding Layer | | Si | 80 nm | Si | 100 nm | Si | 120 nm | Si | 100 nm |
| Protective Layer | | $Si_3N_4$ | 160 nm | $Si_3N_4$ | 155 nm | $Si_3N_4$ | 165 nm | $Si_3N_4$ | 70 nm |
| Average Luminous Transmittance (%) | | 6.0 | | 5.4 | | 4.3 | | 5.1 | |
| Color Tone | Before Heat Resistance Test | Silver | | Silver | | Silver | | Silver | |
|  | After Heat Resistance Test | Silver | | Silver | | Silver | | Silver | |
| Chromaticity (x, y) | Before Heat Resistance Test | 0.274 | 0.318 | 0.286 | 0.322 | 0.303 | 0.323 | 0.286 | 0.322 |
|  | After Heat Resistance Test | 0.263 | 0.320 | 0.275 | 0.324 | 0.293 | 0.325 | 0.271 | 0.326 |
| Transmissivity to Blue Light | | 20.3 | | 14.4 | | 10.4 | | 13.9 | |
| Resistivity (Ω/□) | | $2 \times 10^8$ | | $2 \times 10^8$ | | $2 \times 10^8$ | | $2 \times 10^8$ | |

TABLE 2

|  |  | No. 5 | | No. 6 | | No. 7 | | No. 8 | |
| --- | --- | --- | --- | --- | --- | --- | --- | --- | --- |
| Glass Substrate | | Crystallized Glass | | Crystallized Glass | | Crystallized Glass | | Crystallized Glass | |
| Light Shielding Layer | | Si | 100 nm | Si | 100 nm | Si | 100 nm | Si | 100 nm |
| Protective Layer | | $Si_3N_4$ | 100 nm | $Si_3N_4$ | 140 nm | $Si_3N_4$ | 175 nm | $Si_3N_4$ | 190 nm |
| Average Luminous Transmittance (%) | | 5.2 | | 5.3 | | 5.3 | | 5.2 | |
| Color Tone | Before Heat Resistance Test | Silver | | Silver | | Silver | | Silver | |
|  | After Heat Resistance Test | Silver | | Silver | | Silver | | Silver | |

TABLE 2-continued

|  |  | No. 5 | | No. 6 | | No. 7 | | No. 8 | |
| --- | --- | --- | --- | --- | --- | --- | --- | --- | --- |
| Chromaticity (x, y) | Before Heat Resistance Test | 0.286 | 0.322 | 0.286 | 0.322 | 0.286 | 0.322 | 0.286 | 0.322 |
|  | After Heat Resistance Test | 0.273 | 0.325 | 0.274 | 0.324 | 0.278 | 0.323 | 0.280 | 0.322 |
| Transmissivity to Blue Light | | 14.0 | | 14.2 | | 14.2 | | 14.0 | |
| Resistivity ($\Omega/\square$) | | $2 \times 10^8$ | | $2 \times 10^8$ | | $2 \times 10^8$ | | $2 \times 10^8$ | |

TABLE 3

|  |  | No. 9 | | No. 10 | | No. 11 | | No. 12 | |
| --- | --- | --- | --- | --- | --- | --- | --- | --- | --- |
| Glass Substrate | | Crystallized Glass | | Crystallized Glass | | Crystallized Glass | | Crystallized Glass | |
| Light Shielding Layer | | Si | 20 nm | Si | 200 nm | Si | 100 nm | Ti | 100 nm |
| Protective Layer | | $Si_3N_4$ | 100 nm | $Si_3N_4$ | 120 nm | $Si_3N_4$ | 40 nm | $Si_3N_4$ | 100 nm |
| Average Luminous Transmittance (%) | | 27.0 | | 0.2 | | 5.0 | | 0.2 | |
| Color Tone | Before Heat Resistance Test | Pale Red-Brownish Silver | | Silver | | Silver | | Silver | |
|  | After Heat Resistance Test | Pale Red-Brownish Silver | | Silver | | Reddish Silver | | Silver | |
| Chromaticity (x, y) | Before Heat Resistance Test | 0.255 | 0.204 | 0.313 | 0.325 | 0.286 | 0.322 | 0.285 | 0.302 |
|  | After Heat Resistance Test | 0.239 | 0.193 | 0.312 | 0.317 | 0.221 | 0.316 | 0.281 | 0.299 |
| Transmissivity to Blue Light | | 44.2 | | 0.1 | | 13.8 | | 1.0 | |
| Resistivity ($\Omega/\square$) | | $2 \times 10^8$ | | $2 \times 10^8$ | | $2 \times 10^8$ | | 20 | |

TABLE 4

|  |  | No. 13 | |
| --- | --- | --- | --- |
| Glass Substrate | | Crystallized Glass | |
| Protective Layer | | $Si_3N_4$ | 74 nm |
| Light Shielding Layer | | Si | 100 nm |
| Protective Layer | | $Si_3N_4$ | 100 nm |
| Average Luminous Transmittance (%) | | 1.2 | |
| Color Tone | Before Heat Resistance Test | Dark Brownish Silver | |
|  | After Heat Resistance Test | Red-Brownish Silver | |
| chromaticity (x, y) | Before Heat Resistance Test | 0.280 | 0.274 |
|  | After Heat Resistance Test | 0.260 | 0.243 |
| Transmissivity to Blue Light | | 5.8 | |
| Resistivity ($\Omega/\square$) | | $2 \times 10^8$ | |

Samples Nos. 1 to 8 are examples according to the present invention, and Samples Nos. 9 to 13 are Comparative Examples.

Patent Document 1 discloses a top plate having a Si film with a thickness of 20 nm, like Sample No. 9, and a top plate having a Si film with a thickness of 200 nm, like Sample No. 10. However, as shown in TABLE 3, Sample No. 9 including a light shielding layer with a thickness of 20 nm has a color tone of pale red-brownish silver and can be therefore seen as inferior in metallic luster. Furthermore, Sample No. 9 has an average luminous transmittance as high as 27.0% in the wavelength range of 400 to 700 nm and can be therefore seen as inferior in light shielding ability to hide the internal structure of the cooking appliance. Sample No. 10 including a light shielding layer with a thickness of 200 nm has a transmissivity to blue light of 0.1 times that of Sample No. 12 and can be therefore seen as inferior in transmissivity to blue light.

It has been found that Sample No. 11 includes a protective layer with a small thickness and that therefore, after the heat resistance test, it caused a color change and significantly changed the chromaticity.

It has been found that in Sample No. 12 using a Ti film as a light shielding layer, the light shielding layer has a low resistivity and that therefore the sample is poor in insulation property. From this, it can be seen that if a top plate uses a Ti film as a light shielding layer, an insulating film must be formed therein in order to provide a touch sensor part.

Patent Document 1 also discloses a top plate having a structure in which a light shielding layer is sandwiched between upper and lower protective layers, like Sample No. 13. However, the top plate sample having a structure in which a light shielding layer was sandwiched between protective layers like this changed the color tone after the heat resistance test. Therefore, the sample can be seen as inferior in heat resistance.

Samples Nos. 1 to 8 of examples according to the present invention have small average luminous transmittances of 6.0% or less in the wavelength range of 400 to 700 nm and can be therefore seen as excellent in light shielding ability to hide the internal structure of the cooking appliance. Furthermore, these samples showed small changes in color tone and chromaticity between before and after the heat resistance test and can be therefore seen as having good heat resistance. Moreover, these samples have higher transmissivities to blue light than Sample No. 12 using a conventional Ti film as a light shielding layer and can be therefore seen as excellent in visibility of blue light.

In addition, these samples have high resistivities at the light shielding layers and have insulation property. Therefore, it can be seen that these samples can be provided with a touch sensor part without involving the provision of an insulating film.

Although in the above inventive examples a Si film was used as a light shielding layer, it has been confirmed that even if a Ge film is used as a light shielding layer in the above examples, the same effects can be obtained.

Although in the above inventive examples a $Si_3N_4$ film was used as a protective layer, it has been confirmed that if a $SiO_2$ film, a $TiO_2$ film, a $Nb_2O_5$ film, a $ZrO_2$ film or a $Ta_2O_5$ film is used as a protective layer, the same effects can be obtained.

As described so far, according to the present invention, a top plate for a cooking appliance can be provided which can include a touch sensor part without involving the provision of an insulating film, has excellent visibility of light for indication from a blue LED or the like disposed behind the top plate, excellent light shielding property for preserving the aesthetic quality, and excellent heat resistance.

The invention claimed is:

1. A top plate for a cooking appliance disposed over the cooking appliance which includes a touch sensor portion arranged to control the cooking appliance, the top plate comprising:
    a glass substrate;
    an opaque light shielding layer disposed on an underside of the glass substrate, having a thickness of 50 to 190 nm and made of Si or Ge; and
    a protective layer covering the light shielding layer and made of at least one material selected from the group consisting of silicon nitride, silicon oxide, titanium oxide, niobium oxide, zirconium oxide, and tantalum oxide; wherein
    the light shielding layer and the protecting layer are arranged in both of a first region of the top plate in which the touch sensor portion is arranged and a second region which corresponds to all remaining portions of the top plate other than the first region.

2. The top plate for a cooking appliance of claim 1, wherein the light shielding layer and the protective layer are close to an interior in which the cooking appliance is located.

3. The top plate for a cooking appliance of claim 1, wherein the thickness of the protective layer is selected so that the minimum peak in a reflectance spectrum observed from the side of the top plate on which the protective layer is disposed is in the wavelength range of 470 to 480 nm.

4. A cooking appliance, comprising:
    the top plate for a cooking appliance of claim 1, wherein the cooking appliance comprises a blue LED for emitting light for indication passing through the top plate for the cooking appliance.

5. The cooking appliance of claim 1, wherein the touch sensor portion includes:
    an electrode disposed on the side of the glass substrate on which side the light shielding layer and the protective layer are provided; and
    a conductive ink layer disposed on the opposite side of the glass substrate.

6. The top plate for a cooking appliance of claim 1, wherein the top plate has a metallic luster.

7. The top plate for a cooking appliance of claim 1, wherein the top plate has a silver color tone.

\* \* \* \* \*